Aug. 24, 1926.
W. S. BALL
1,597,229
APPARATUS FOR PRODUCING DISSOLVING EFFECTS IN MOTION PICTURES
Filed April 10, 1923     5 Sheets-Sheet 1
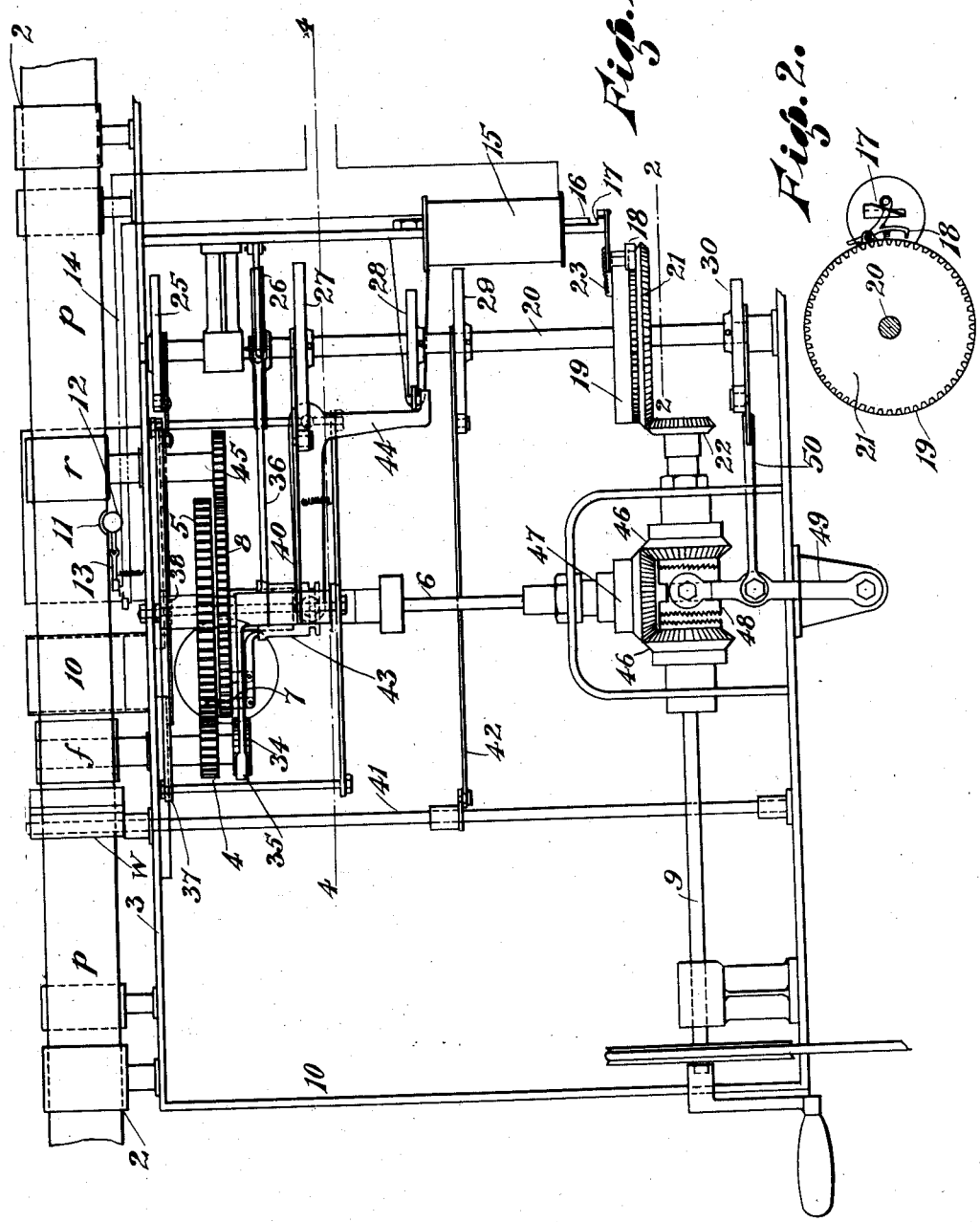
INVENTOR
WALDON S. BALL.
BY Dewey, Strong,
Townsend and Loftus
ATTORNEYS.

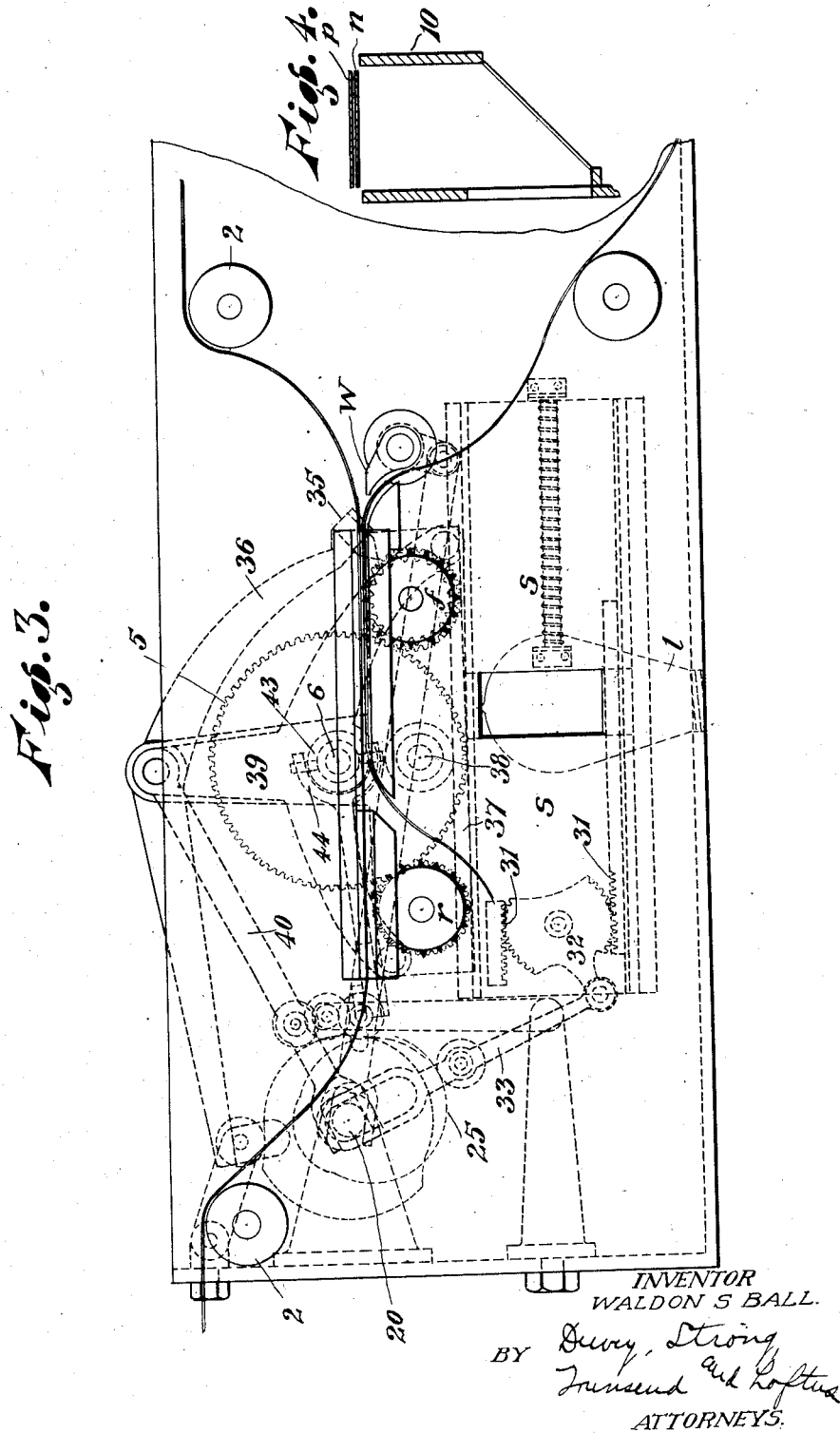

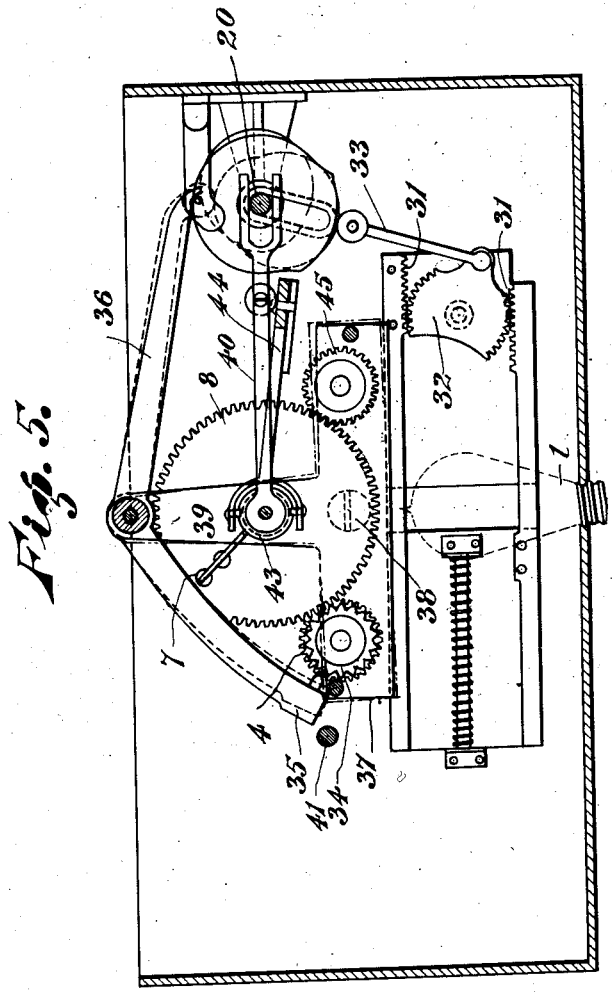

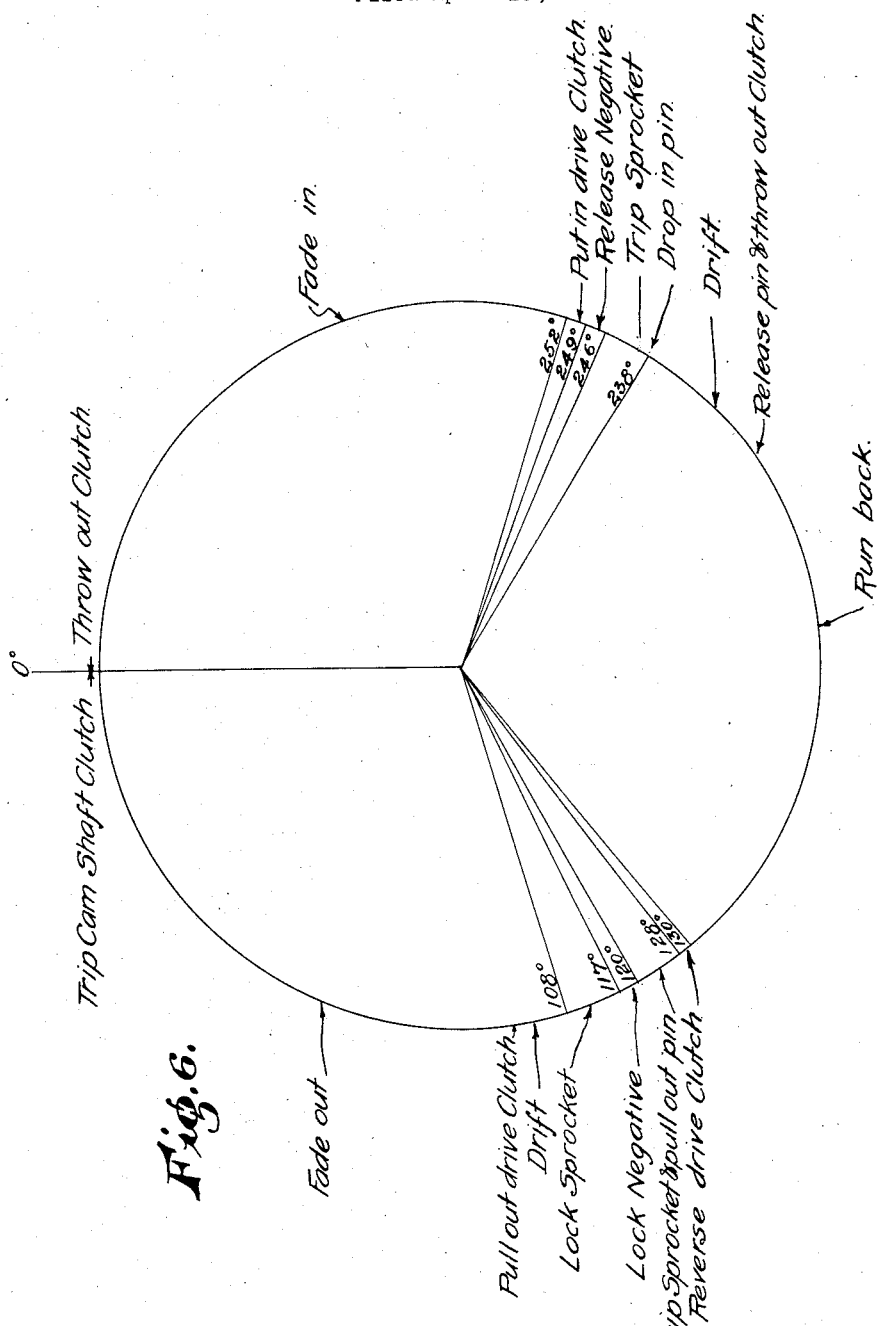

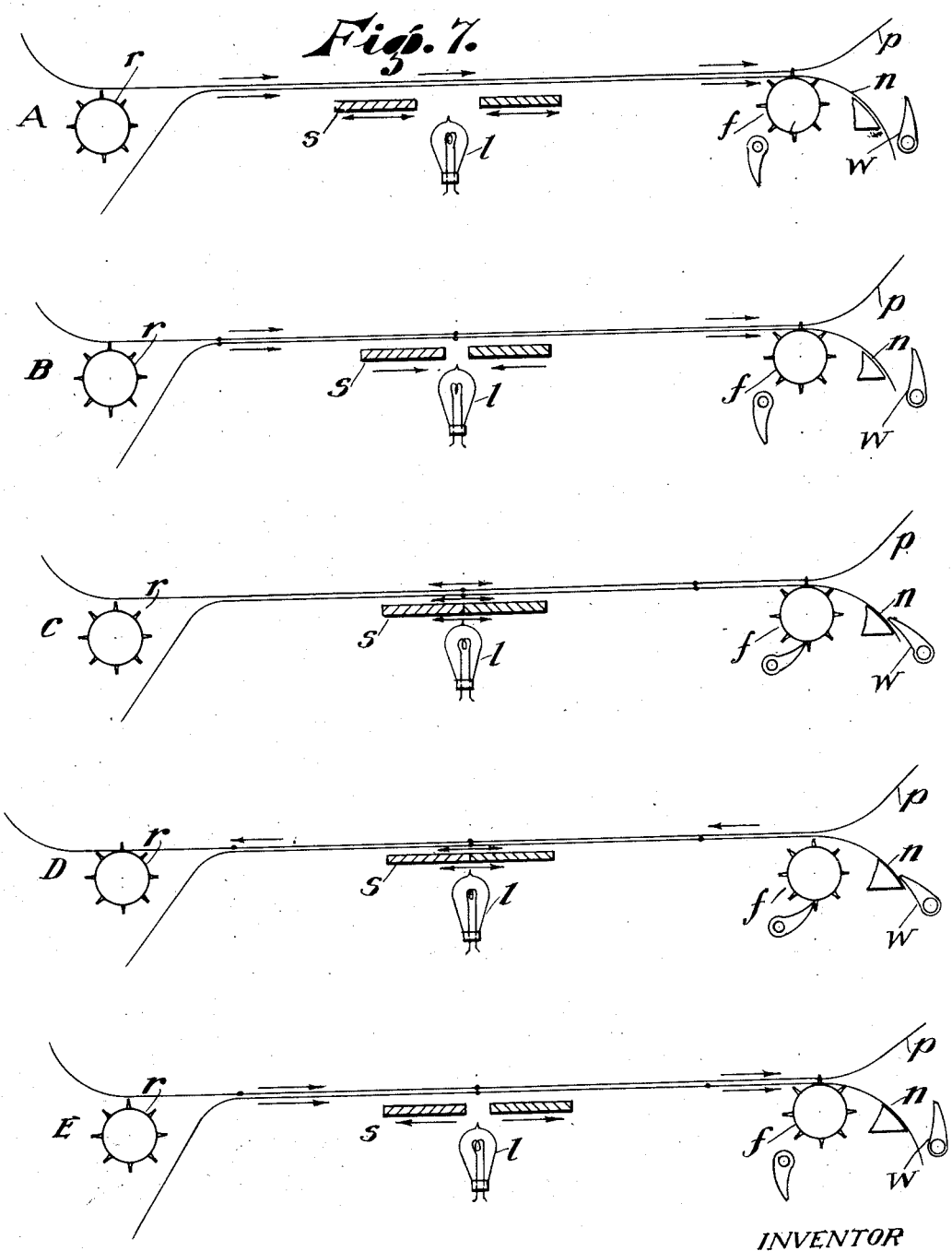

Patented Aug. 24, 1926.

1,597,229

UNITED STATES PATENT OFFICE.

WALDON S. BALL, OF SAN FRANCISCO, CALIFORNIA.

APPARATUS FOR PRODUCING DISSOLVING EFFECTS IN MOTION PICTURES.

Application filed April 10, 1923. Serial No. 631,083.

This invention relates to a method of and apparatus for producing dissolving effects in motion picture films.

Hitherto the so-called dissolving effects, i. e., where one scene or title gradually fades out and simultaneously another or different scene or title gradually appears, have been the result of manipulation of the camera at the time of exposing the film. This is done by gradually closing the shutter aperture at the end of one scene, backing up the negative film in the camera and again exposing it to the new scene with the shutter opening being gradually enlarged. Quite frequently it happens that a desire for these dissolving effects is not known at the time of taking the film, but only becomes apparent when exhibiting the film for cutting and editing purposes, in which case it is too late to produce the desired effect.

The object of my invention is to produce these dissolving effects during the printing of the films. This object I accomplish by making some kind of a marker or indentation on the negative film at the point where the dissolving effect is desired, which marker will set into operation mechanism which will first gradually close the shutter aperture in the printing machine, then lock the negative film, disconnect the forward driving sprocket from the films and shift a reverse driving sprocket into engagement with the positive film so as to carry the latter rearwardly the required distance while the negative remains stationary. Thereafter the forward driving sprocket is placed in engagement with both films and the shutter aperture commences gradually to open. Thus the positive film is printed with a fade out of one scene and fade in of a different scene, the two overlapping.

One form of apparatus suitable for practicing my invention is shown in the accompanying drawings, wherein—

Fig. 1 is a plan view.

Fig. 2 is a detail view taken on the line 2—2 of Fig. 1.

Fig. 3 is a front view of the machine.

Fig. 4 is a detail sectional view of a periscopic arrangement used in the mahcine for changing the direction of light.

Fig. 5 is a sectional view taken on the line 4—4 of Fig. 1.

Fig. 6 is a diagram showing the time relation of the various cams used in the machine.

Fig. 7 is a diagram showing the various steps in the operation of the machine.

It will perhaps lead to a clearer understanding of the method and apparatus to refer first to Fig. 7. In this diagram the negative film is indicated by the letter $n$ and the positive film by the letter $p$. The forward driving sprocket is indicated by the letter $f$ and the reverse driving sprocket by the letter $r$. The slides for controlling the size of the shutter opening are indicated by the letter $s$ and the lamp or other source of illumination is shown at $l$.

In the position A the films are in contact with each other and are being driven in unison to the right by the forward driving sprocket $f$. In this position the slides $s$ are commencing to close the shutter aperture. At position B the slides are partially closed and at C the slides are entirely closed and the films are stopped. At the position D the negative film is held against movement by a clamp $w$ after the forward drive sprocket has been shifted out of engagement with the films and a reverse driving sprocket has been moved into engagement with the positive film. At position E the positive film has been reversed the required distance, the forward driving sprocket has again been placed in engagement with both films and the films are again travelling in unison to the right with the shutter slides starting to open gradually.

By referring to Fig. 1 the organization of the mechanism for carrying out these steps will be seen. The positive and negative films travel horizontally over suitable guides 2 at the front of the frame 3, the positive film being on the top. During normal operation the films are driven by the sprocket $f$ which in turn is driven by a pinion 4 meshing with a gear 5, the latter being loosely mounted upon a counter drive shaft 6. Clutch pins 7 connect the gear 5 with a gear 8 which is fixed on the counter shaft. The counter shaft is driven through bevel gearing by means of a drive shaft 9. The light or other source of illumination $l$ is shown as being directed upon the films through a periscopic device 10 best illustrated in Fig. 4.

At desired intervals in the negative film are notches 11 marking the points at which it is desired to produce dissolving effects. Co-operating with these notches is a spring-pressed roller 12 journaled on one end of a pivoted arm 13, the other end of the arm constituting a terminal of an electric circuit 14 which controls a solenoid magnet 15. When the roller 12 drops into a notch in the films the terminal on the arm 13 closes a circuit through the solenoid magnet and the latter retracts a plunger 16 on the end of which is an inclined lug or cam 17, best shown in Fig. 2. This cam 17 co-acts with a pawl 18 which is pivotally mounted upon a disk 19 fixed to a cam shaft 20. Adjacent the drum and loose on the cam shaft is a combined bevel gear and ratchet wheel 21. This bevel gear is in constant rotation, being in mesh with a pinion 22 on the drive shaft 9. When the plunger 16 of the solenoid magnet is in normal position it will cause the pawl 18 to be disconnected from the ratchet wheel 21 so that motion of the combined bevel gear and ratchet wheel will not be transmitted to the cam shaft 20. When, however, the solenoid magnet is energized and its plunger retracted, the pawl 18 will be pulled into engagement with the teeth of the ratchet wheel by a spring 23. Thereby the drum 19 and the cam shaft 20 are set in operation. Upon completing one revolution the pawl 18 again strikes the inclined face 17 and disconnects the cam shaft.

On the cam shaft 20 are six separate cams numbered from front to rear as 25 to 30 respectively. The cam 25 controls the slides s which in turn control the size of the shutter aperture. The cam 26 controls a locking device for the forward drive sprocket. The cam 27 controls a tilting frame which shifts the forward and reverse sprockets in and out of engagement with the films. The cam 28 controls the clutch pins 7, the cam 29 controls the clamping means w which holds the negative film against movement and the cam 30 controls a reversing clutch.

The means for operating the slides s are best seen in Fig. 3, there being a rack 31 on each of these slides meshing with a segmental gear 32, which gear is rocked by a reciprocating arm 33 actuated by the cam 25. When the arm 33 is moved outwardly by the cam the slides are moved apart and when the arm is moved inwardly the slides are moved towards each other. The shape and timing of this cam are such that as soon as the cam shaft 20 is set in operation the slides will start to close and will remain closed while the other operations of shifting the forward and reverse sprockets, locking the negative film and reversing the positive film are being carried on. After the positive film has been moved the desired distance in the reverse direction and the mechanism is again reset for normal operation these slides will start to open.

As soon as the slides are closed further driving of the films is interrupted by the cam 30 which throws a drive clutch 48 into neutral position. Thereafter, the films may drift forwardly a slight distance.

In order to insure that this forward drive sprocket shall be positively locked to insure stoppage of the films I provide a locking arrangement which comprises a toothed wheel 34 fixed upon the shaft of the forward drive sprocket. A detent 35 is disposed adjacent this toothed wheel, being carried upon a lever 36 which is actuated by the cam 26.

The forward sprocket being locked, it is also desirable to lock the negative film so that the sprocket and film will not get out of step. This locking of the negative film is accomplished through the clamp w which is fixed upon a rock shaft 41, the latter being actuated by a reciprocating rod 42 controlled by the cam 29.

The forward drive sprocket and negative film being thus locked, the forward sprocket and reverse sprocket are now shifted so as to move the former out of mesh with the films and bring the latter into mesh with the positive film. This is brought about by mounting the shafts of these two sprockets upon a tilting frame 37 pivoted at 38 to the main frame. An arm 39 extends upwardly from the tilting frame and is connected to a reciprocating rod 40 actuated by the cam 27. The clutch pins 7 are disconnected and this is accomplished by connecting said pins 7 with a sleeve 43, which is slidably mounted on the counter shaft 6. This sleeve is shifted by a bell crank lever 44 actuated by the cam 28. These clutch pins, being disconnected, further driving motion of the forward sprocket ceases.

The reverse sprocket is driven through a pinion 45 which meshes with the gear 8, and, hence, in order to drive the said reverse sprocket in a direction opposite to the forward drive sprocket it becomes necessary to reverse the direction of movement of the gear 8, and this is done by arranging two bevel pinions 46 upon the drive shaft 9, both meshing with a bevel pinion 47 on the counter shaft 6. The drive clutch 48 is splined upon the drive shaft 9 and is positioned between the two bevel pinions 46 and is adapted to engage either one thereof or to occupy a neutral position. This clutch 48 is controlled by a shift arm 49 connected to a reciprocating rod 50, which in turn is actuated by the cam 30. The timing of this cam is such that as soon as the various operations and steps above mentioned have been completed the clutch 48 will be thrown in a reverse position, thus driving the sprocket r and carrying the positive film backwardly the required distance. As soon as the positive film has been returned the required distance the cam 30 will thrust the clutch 48 into neutral position.

The counter shaft 6 will drift slightly following the release of the clutch 48 and at this time the cam 28 will act to move the clutch pin 7 into engagement with the gear 5, which being locked by its engagement with the forward drive sprocket will serve as a definite brake upon any further drifting of the counter shaft or reverse driving sprocket. Thereafter the cam 27 will actuate the tilting frame so as to bring the forward drive sprocket into mesh with the films, while carrying the reverse driving sprocket out of mesh with the positive film and the cam 29 will release the clamp $w$ which locks the negative film, while at the same time the cam 26 will release the detent which locks the forward drive sprocket. The cam 30 now acts to thrust the clutch 48 into its normal driving position so that both films will be driven forwardly and simultaneously therewith the cam 25 will actuate the slides so as to cause them to gradually enlarge the shutter aperture.

A preferred timing relation of the cams is illustrated in diagram in Fig. 6.

By "dissolving effects", as used in the claims, I mean an overlapping of scenes or exposures, one gradually decreasing and the other simultaneously increasing in strength inversely.

Aside from the artistic effects of dissolving scenes, it is a recognized fact that such dissolving effects are less tiring to the eyes of an observer, particularly where titles are used. A certain scene may be comparatively dull or dark and be followed immediately by a brightly illuminated title, and such sudden changes from dark to light, and vice versa, produce great strain upon the eyes. In and by the present invention these sudden changes can be avoided without any appreciable trouble or expense in the manufacture of the films, it being necessary only to notch the negative film where the dissolve is to occur and the printing machine automatically functions to produce these effects.

It will be understood that the particular method and apparatus herein disclosed are merely exemplary and that various changes in the specific steps of the method and in the construction and arrangement of the several parts of the apparatus may be employed without departing from the spirit of my invention as disclosed in the appended claims.

Having thus described my invention, what I claim and desire to secure by Letters Patent is:—

1. In a printing machine for motion picture films an apparatus for producing dissolving effects comprising in combination means for gradually and successively decreasing and increasing the intensity of the light, means to shift one film with relation to the other, and means actuated by a marker on the negative film to put said light-controlling and film-shifting means in operation.

2. In a printing machine for motion picture films an apparatus for producing dissolving effects comprising in combination means for gradually and successively decreasing and increasing the intensity of the light, means for holding the negative film in stationary position, means to shift the positive film with relation to the negative and means actuated by a marker on the negative film to control the operation of said means, whereby a portion of the positive film which has been printed with decreasing light may be printed with increasing light.

3. In a printing machine for motion picture films, an apparatus for producing dissolving effects comprising in combination means for gradually and successively decreasing and increasing the intensity of light, means to actuate the negative and positive film in unison, means to lock the negative film and actuating means therefor, other means to shift the positive film rearwardly while the negative is stationary, means to restore the normal operation of the films and actuating means and means actuated by a marker on the negative film for putting all of said means into operation.

4. In a printing machine for motion picture films an apparatus for producing dissolving effects comprising slides to control the area of the light-emitting aperture, a forward driving sprocket for the films and a reverse driving sprocket for the positive film, locking means for the negative film, cams for controlling said slides, sprocket wheels and locking means and means actuated by a marker on the negative film for putting said cam means in operation.

5. In a printing machine for motion picture films, an apparatus for producing dissolving effects comprising in combination means for moving the negative and positive film forwardly, means for gradually and successively decreasing and increasing the intensity of the light, clutch mechanism for controlling the operation of the forward driving means, means for shifting the positive film rearwardly with relation to the negative film, cam means for actuating said light-varying means, clutch mechanism and shifting means whereby first to decrease the light intensity, then to interrupt the forward drive of the films, then to shift the positive film rearwardly, and thereafter restore the forward drive to normal operation and gradually increase the light intensity, and automatic means for putting said cam means in operation.

6. In a printing machine for motion picture films, an apparatus for producing dissolving effects comprising in combination means for driving the negative and positive film forwardly, means for gradually and successively decreasing and increasing the intensity of the light, clutch mechanism for controlling the operation of the forward drive means, means for shifting the positive film rearwardly with relation to the negative film, an intermittently operating shaft, cam means on said shaft for actuating said light-varying means, clutch mechanism and shifting means, and means controlled by a marker on the negative film for putting said intermittently operating shaft in operation.

7. In a printing machine for motion picture films, an apparatus for producing dissolving effects comprising in combination means for moving the negative and positive film forwardly, means for gradually and successively increasing and decreasing the intensity of the light, clutch mechanism to control the operation of the forward drive, means to lock the forward drive against movement, means to lock the negative film against movement, a reverse drive, means to shift the forward drive out of mesh with the films, and shift the reverse drive into mesh with the positive film, means to control the operation of the reverse drive and means controlled by a marker on the negative film for putting said mechanism in operation.

WALDON S. BALL.